United States Patent [19]
Butler et al.

[11] 3,819,258
[45] June 25, 1974

[54] FILM FRAMING AND TRANSPORT SYSTEM

[75] Inventors: Lawrence W. Butler, Fallbrook; Roger W. Banks, Irvine, both of Calif.

[73] Assignees: Scripps Clemans, Inc.; Lawrence N. Butler, both of Fallbrook, Calif.

[22] Filed: Sept. 20, 1972

[21] Appl. No.: 290,679

[52] U.S. Cl................. 352/163, 352/166, 352/176, 352/182, 352/187
[51] Int. Cl. ............................................ G03b 21/46
[58] Field of Search ........... 352/163, 176, 180, 182, 352/187, 190, 166

[56] References Cited
UNITED STATES PATENTS
2,192,987  3/1940  Runge................................ 352/163
3,565,521  2/1971  Butler................................ 352/163
3,692,394  9/1972  Bauer.............................. 352/180 X Primary Examiner—Monroe H. Hayes
Attorney, Agent, or Firm—Lindenberg, Freilich & Wasserman

[57] ABSTRACT

A film framing and transport system with provision for precisely positioning each frame of film during a film advance interval. A servo motor drives a film sprocket wheel for advancing film frame by frame. Control signals for operating the servo motor are produced by a synchronizing circuit and pulse circuitry, a velocity tachometer and a positioning circuit. The servo motor control signals cause the servo motor to accelerate and decelerate the film sprocket wheel at a rapid initial and final rate relative to the pull down interval, but sufficiently gradual to avoid excess film sprocket hole wear. The positioning circuitry precisely positions the film sprocket wheel at the end of each pull down interval.

22 Claims, 14 Drawing Figures

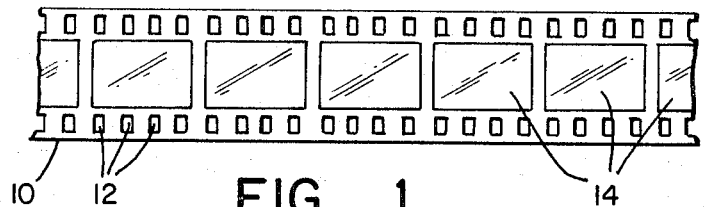
FIG_1
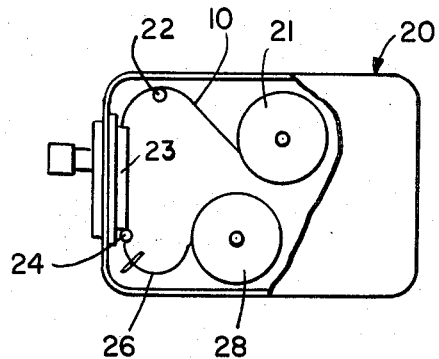
FIG_2
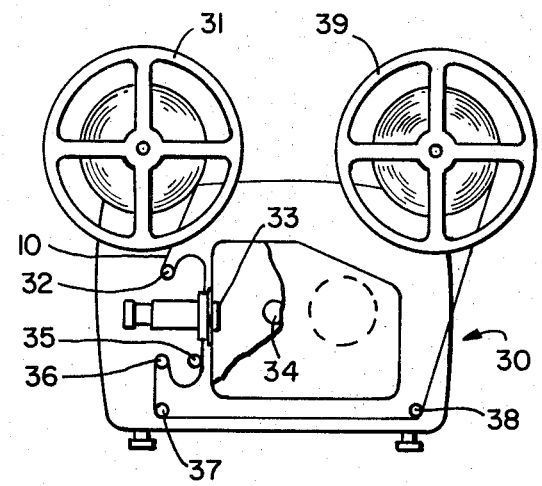
FIG_3
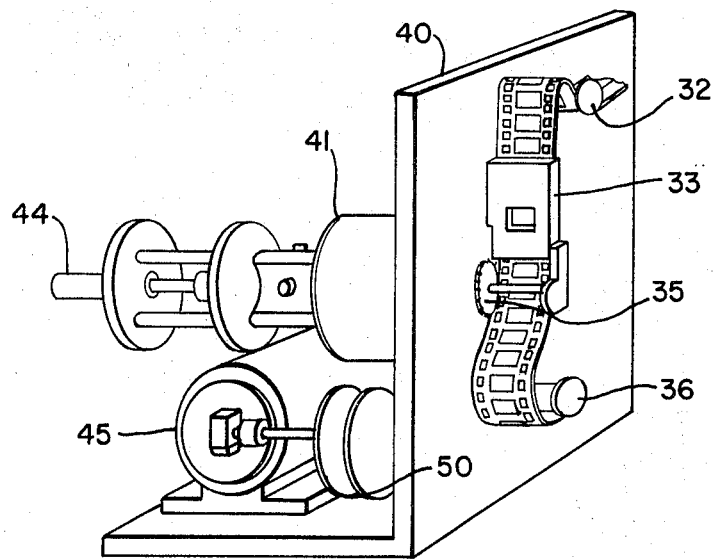
FIG_4

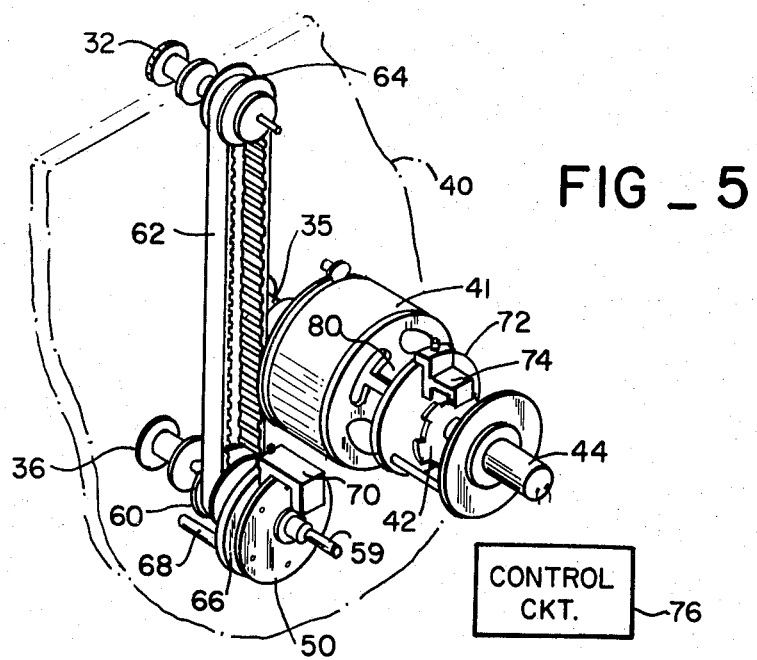
FIG_5
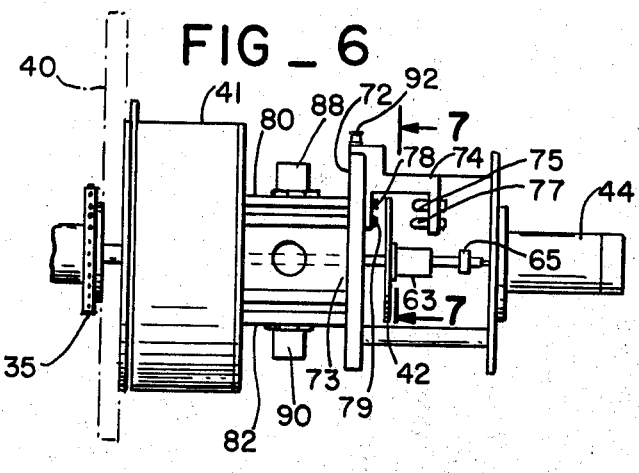
FIG_6
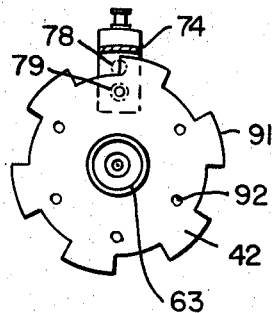
FIG_7
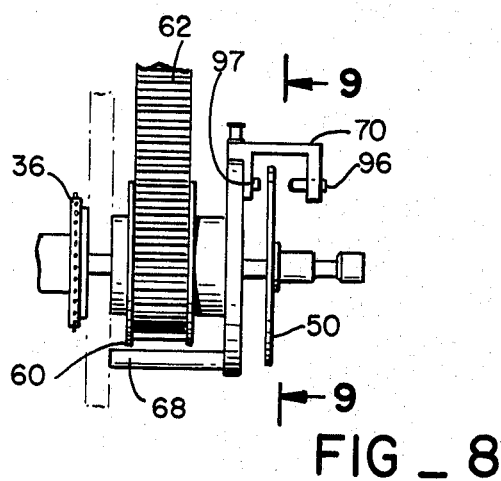
FIG_8
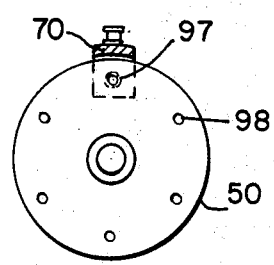
FIG_9

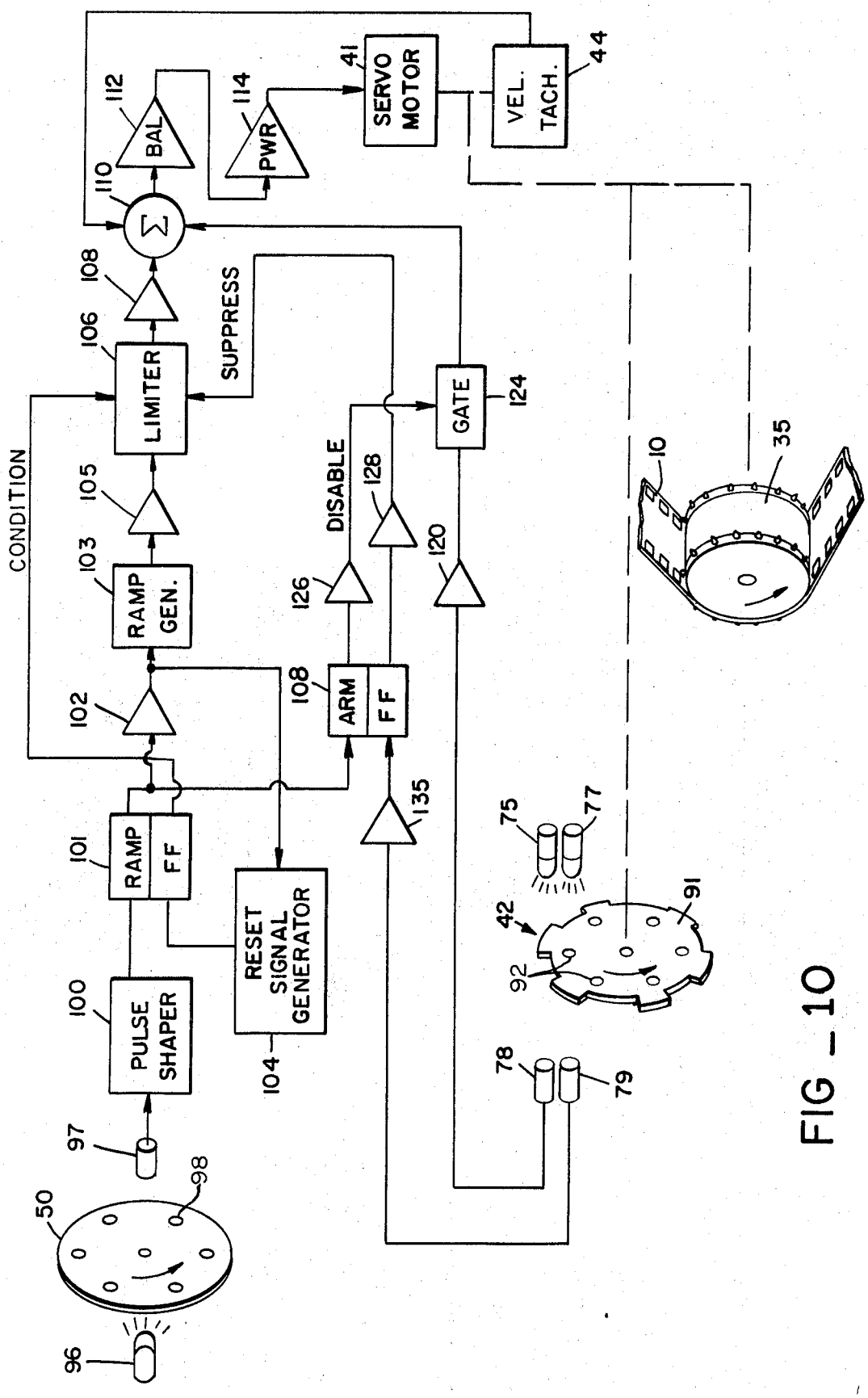
FIG_10

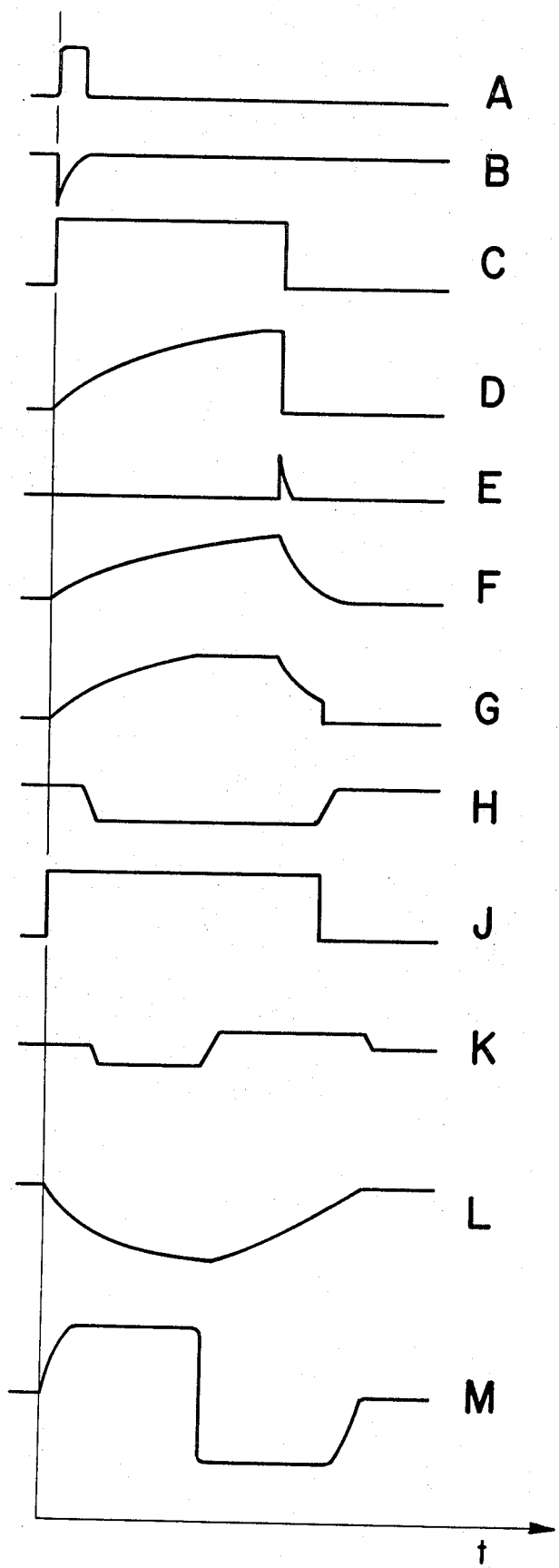
FIG_11

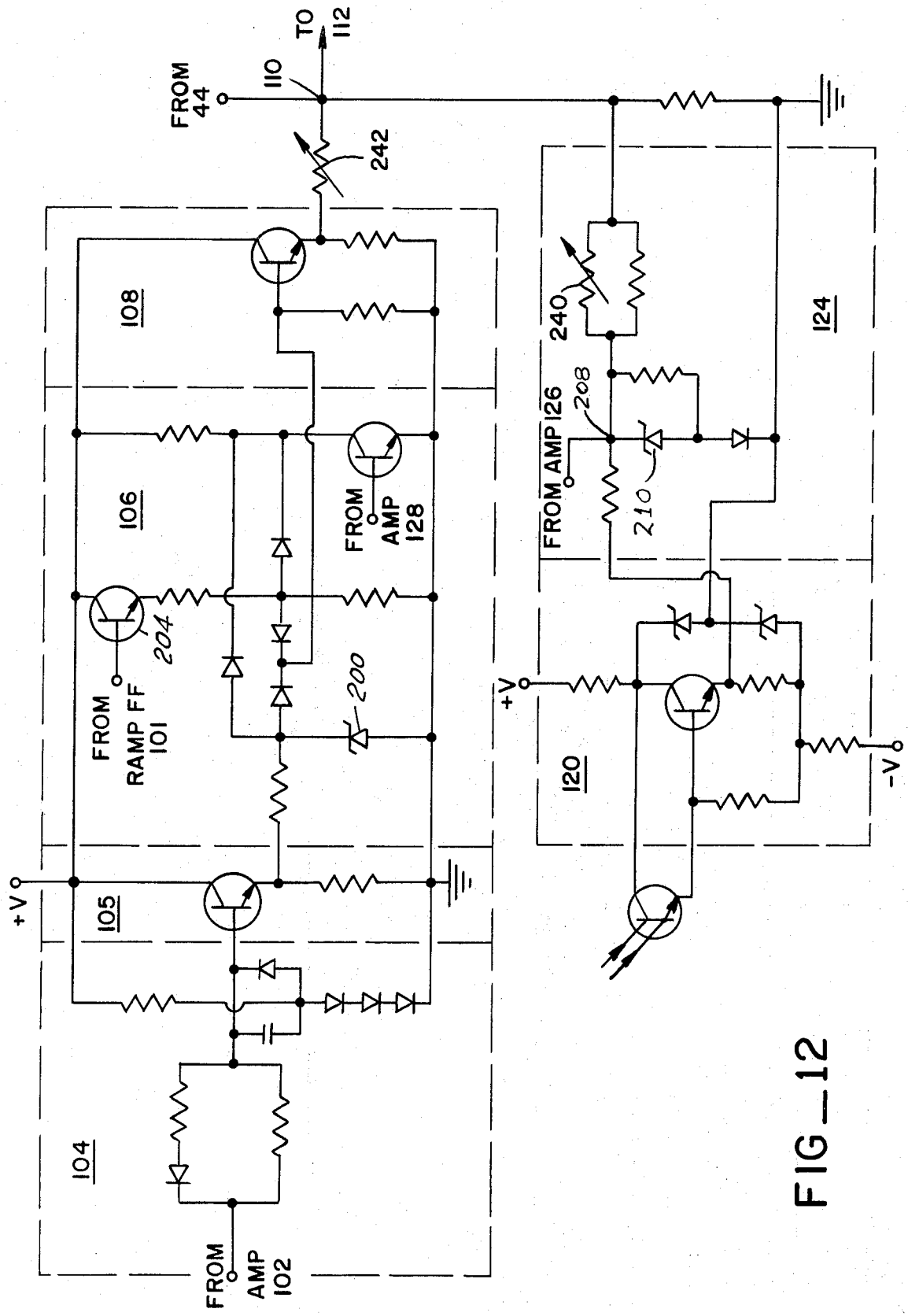
FIG_12

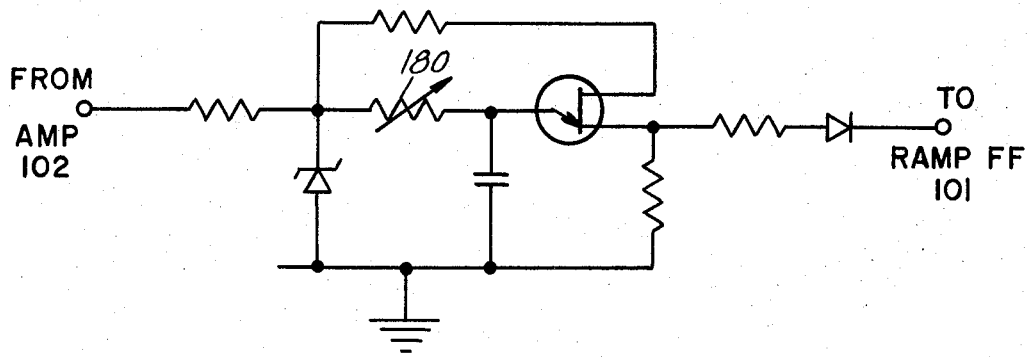
FIG_13
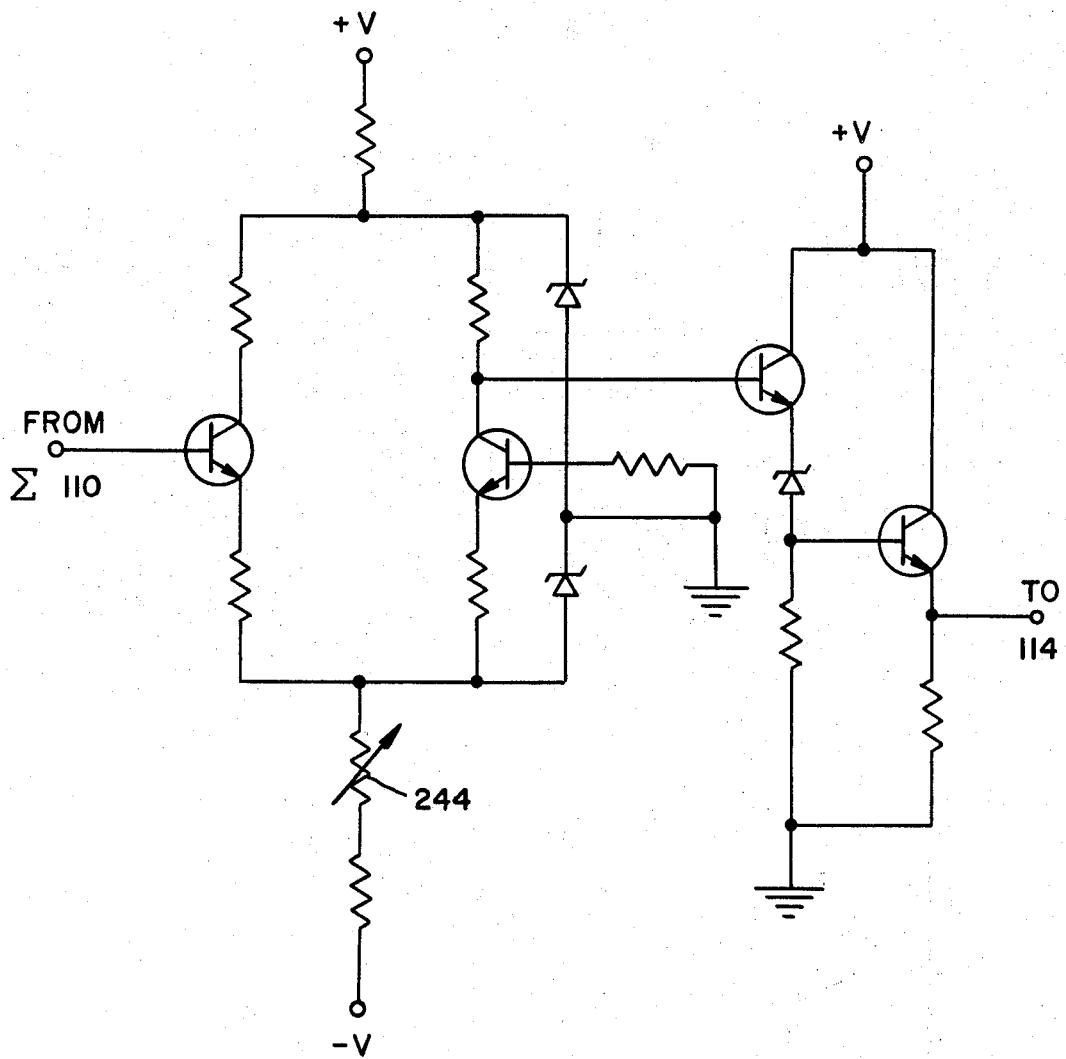
FIG_14

FILM FRAMING AND TRANSPORT SYSTEM

BACKGROUND OF THE INVENTION

1. Field of the Invention

This invention relates to film transport systems of the type used to advance film through a camera or projector. More particularly, this invention relates to film transport systems of the Butler type, such as that disclosed in U.S. Pat. No., 3,565,521, issued Feb. 23, 1971.

2. Brief Description of the Prior Art

The above referenced patent discloses a film transport system suitable for use in a camera or projector for advancing film having sprocket perforations through a film gate. The term film gate is used herein to signify either a camera light aperture or a projector light gate. The film is advanced by means of a film sprocket wheel which is intermittently driven by a servo motor in response to control signals. If the film under transport has four sprocket holes per frame, e.g., the sprocket wheel is rotated during each film advance interval an angular distance sufficient to advance the four sprocket teeth past a given point, the teeth meshing with the film sprocket holes.

A film advance interval is initiated by a synchronizing pulse generated by a rotating synchronizing disc having a plurality of light transmitting holes and a light source and photosensor positioned on opposing sides of the synchronizing disc. The synchronizing disc is rotated by a constant speed motor which drives a pair of film feed sprockets on either side of the film gate. Each synchronizing pulse conditions control circuitry for generating a servo motor control signal. The final position of the sprocket wheel at the end of a film advance interval is determined by a positioning circuit comprising a serrated positioning disc, rotated by a servo motor, a light source and photosensor positioned on opposing sides of the positioning disc, and associated control circuitry.

While the above system has been found to function in a satisfactory manner, in certain applications it has been observed that the rate of initial acceleration and deceleration of the film sprocket wheel is so abrupt that the film sprocket holes tend to be damaged by the sprocket teeth after several passes of the film through the unit. If the sprocket holes become too distorted, the frame registration of the film in the film gate suffers accordingly, with the result that the film may be rendered unusable.

A further disadvantage noted in the above mentioned device resides in the positioning circuitry. In some applications, it has been observed that the positioning circuitry does not provide the required degree of preciseness for accurately registering each film frame in the film gate.

SUMMARY OF THE INVENTION

The invention disclosed herein comprises an improvement over the above noted film framing and transport system which is directed to remedying the above noted disadvantages. The improved film framing and transport system includes control circuitry responsive to a succession of synchronizing pulses for generating servol motor control signals which cause the film sprocket wheel to be initially accelerated and finally decelerated during a film advance interval at a rapid initial and final rate relative to the length of the film advance interval, the rate being sufficiently gradual, however to avoid distortion of the film sprocket holes.

In a further aspect, the invention comprises a positioning circuit employing a positioning disc and a pair of photo cells and associated circuitry for precisely positioning the film sprocket wheel, and thus the film, to insure accurate registration of each film frame in the light gate.

For a fuller understanding of the nature and advantages of the invention, reference should be had to the following detailed description, taken in conjunction with the accompanying drawings.

BRIEF DESCRIPTION OF THE DRAWINGS

FIG. 1 illustrates a portion of a perforated film;

FIG. 2 illustrates a motion picture camera having a sprocket wheel which moves the film in accordance with the invention;

FIG. 3 illustrates a film projector having a sprocket wheel which moves the film in accordance with the invention;

FIG. 4 illustrates the location of the various elements used for transporting the film past a film gate;

FIG. 5 is an isometric view illustrating the invention;

FIG. 6 is a view in elevation illustrating the placement of the sprocket wheel drive motor and positioning disc;

FIG. 7 is a view in section along lines 7—7 in FIG. 6 illustrating the positioning disc;

FIG. 8 is a view in elevation illustrating the positioning of the synchronizing disc and photo cell;

FIG. 9 is a view along lines 9—9 of FIG. 8 illustrating details of the synchronizing disc;

FIG. 10 is a block diagram of the electrical system of this invention;

FIG. 11 is a timing chart illustrating various wave forms generated by the electrical system;

FIG. 12 is a circuit diagram illustrating certain system components;

FIG. 13 is a circuit diagram of the reset signal generator; and

FIG. 14 is a circuit diagram of the balance amplifier.

DESCRIPTION OF THE PREFERRED EMBODIMENT

Turning now to the drawings, FIG. 1 illustrates a section of a typical film strip 10 employing 4 sprocket holes 12 for each film frame 14. During film exposure and projection each individual frame 14 is positioned at the rate of 24 frames-per second at a light gate at which the frame is exposed either to the source image to be recorded (exposure mode) or a source of light for projecting the image to a viewing screen (projection mode). During the pull down interval when a succeeding frame 14 is being transported to the gate, a shutter is interposed between the film and the source to block the source during this time. The shutter mechanism is well known and operates off the film drive mechanism described below.

FIG. 2 is a schematic illustration of a motion picture camera 20 suitable for use with the present invention. Camera 20 includes the standard pay out reel 21, with film 10 passing over a first guide 22, through a film gate 23 and over a sprocket wheel 24. Sprocket wheel 24 serves the function of moving the film through film gate 23, and operates in accordance with this invention to permit each film frame 14 to be precisely positioned in gate 23. After film 10 passes by the sprocket wheel 24 it is directed by means of another guide 26 around a take up reel 28.

FIG. 3 is a schematic representation of a projector 30 suitable for use with the present invention. Here, a pay out reel 31 pays out film 10 which passes over a first guide 32 and forms a loop. The film passes through a film gate 33 within which it is exposed to light from a source 34. On the bottom side of the film gate is a sprocket wheel 35 which pulls the film 10 through the film gate 33 in accordance with the present invention. Another guide 36 directs the film toward two additional guides 37, 38 from whence the film is pulled up by take up reel 39.

FIG. 4 schematically illustrates the placement of the apparatus in accordance with this invention relative to the film gate and sprocket wheel shown in FIGS. 2 and 3. It is understood that this is by way of illustration only and should not be taken as the sole manner in which this invention may be placed in order to transport film. On the obverse side of a wall 40 of either camera 20 or projector 30 on which sprocket wheel 35 (or 24 ) is mounted, there is positioned a servo motor 41 which drives the sprocket wheel 35 (or 24). Servo motor 41 has a shaft which extends to carry sprocket wheel 35 on one side and extends on the obverse side to drive a positioning disc 42, shown in FIGS. 5-7 the shaft terminating in a velocity tachometer 44. A constant speed motor 45 is used for driving the guide sprocket wheels 32, 36. Constant speed motor 45 also drives a disc 50 containing a plurality of holes the disc being hereafter designated as synchronizing disc 50.

FIG. 5 is an isometric view of the mechanical layout of apparatus in accordance with the instant invention. Constant drive motor 45 is not shown here, but the shaft 59 driven therefrom rotates synchronizing disc 50, a drive wheel 60, as well as small sprocket wheel 36. A timing belt 62 is stretched between drive wheel 60 and a second wheel 64. The second wheel 64 drives a shaft upon which upper small sprocket wheel 32 is mounted.

A bearing support disc 66 is supported by means of rods 68 (only one of which is illustrated for clarity). Disc 66 provides a mounting support for bearings through which shaft 59 extends from motor 45. Bearing support disc 66 also supports a bracket structure 70, in which the lamp and photo cell associated with synchronizing disc 50 are supported.

An additional support disc 72 has mounted thereon a bracket structure 74 which provides support for the photo cells and light sources which are operated in conjunction with positioning disc 42. Control circuits 76 of the invention are indicated in schematic form only and may be mounted in any appropriate manner convenient to the operation of the preferred embodiment. The wiring connections between the control circuits and the various other elements of the system have been omitted in this diagram in the interest of clarity.

FIG. 6 is a view in elevation of servo motor 41, positioning disc 42 and the structure for holding these elements in position relative to one another. FIG. 7 shows the details of positioning disc 42 in relation to the photo cells associated therewith. Servo motor 41 is attached to wall 40. Servo motor 41 has a shaft which extends to the sprocket wheel 35 on one side. On the obverse side, the servo motor shaft extends through a bearing 73 which is held in the end section of servo motor 41, to a shaft coupling 63 which holds positioning disc 42. The shaft velocity tachometer 44 is attached to the driven shaft by a coupling 65.

Flanges 80, 82 form part of the housing of servo motor 41 and extend outwardly toward support disc 72. Support disc 72 is held onto flanges 80, 82 by screws, not shown. Knurled heads 88, 90 comprise the exposed portion of the servo motor brush holders.

Disc 72 also provides support for bracket 74. A pair of light sources 75, 77 and photo cells 78, 79 are supported by bracket 74 on opposite sides of positioning disc 42. The support bracket 74 is attached to disc 72 by means of a tightening screw having a knurled head 92.

As best shown in FIG. 7, positioning disc 42 is provided with six equidimensional, equispaced vanes 91 and six holes 92, each hole 92 being arranged along a circular path concentric with the center of disc 42 and aligned with a different vane such that the edge of a given vane 91 is collinear with a radius extending from the center of disc 42 through the diameter of the associated hole 92. Photo cell 78 is positioned in bracket 74 so that the incident light from associated source 75 may be alternately interrupted by each vane 91 and transmitted by the cut away portion between adjacent vanes 91 as disc 42 rotates. Photo cell 79 is positioned in bracket 74 so that the incident light from associated source 77 may be alternately transmitted through each hole 92 and blocked by the opaque portion of disc 42 between adjacent holes 92 as disc 42 rotates. Photo cells 78, 79 are further arranged in bracket 74 so that a radius extending from the center of disc 42 bisects each photo cell. Since sprocket wheel 35 is provided with twenty-four equispaced teeth in the preferred embodiment, each angular rotation of disc 42 from an initial position wherein a leading edge of a vane 91 is aligned with an imaginary radial bisector of photocell 78 through an angle of 60 degrees to a subsequent position wherein the leading edge of the adjacent vane 91 is so aligned corresponds to an angular rotation of sprocket wheel 35 by four teeth. Since there are four sprocket holes 12 per frame 14, this corresponds to a one frame pull down interval. The purpose of this arrangement is set forth more fully below in the discussion of the operation of the preferred embodiment.

FIG. 8 shows the details of the structure adjacent synchronizing disc 50. A light source 96 and a photo cell 97 are supported by bracket 70 on opposite sides of disc 50. Six holes are provided on the synchronizing disc 50 equally spaced on a circle which passes these openings between light source 96 and photo cell 97. Since the sprocket wheel 35 has twenty-four sprocket teeth as noted above, in one revolution of synchronizing disc 50 the sprocket wheel will move six frames of four sprocket holes per frame.

The operation of the mechanical portion of the preferred embodiment thus far described proceeds as follows. Constant speed motor 45 is energized, rotating guides 32, 36 in the film advance direction and thereby supplying and taking up equal amounts of film 10 in the vicinity of film gate 33. Motor 45 simultaneously rotates synchronizing disc 50, thereby causing photo cell 97 to produce output pulses at the rate of six pulses per revolution of disc 50. Each such output pulse is applied to control circuit 76 to control the operation of servo motor 41, which drives film sprocket wheel 35. As film sprocket wheel 35 is driven, film 10 is advanced through film gate 33 at the rate of one frame (four sprocket holes) for each output pulse from photo cell 97. During this operation, control circuit 76 insures that each frame 14 is precisely positioned in film gate 33 in the following manner.

FIG. 10 illustrates in block diagram form control circuit 76. Various wave forms serving to illustrate the operation of circuit 76 are shown in FIG. 11. The output of photo cell 97, a typical signal being represented by wave form A, is applied as an input signal to a pulse shaper 100. Pulse shaper 100 provides a relatively narrow output pulse having a steep leading edge as illustrated in wave form B. Several circuits are known in the art which are capable of performing the function of pulse shaper 100. In the preferred embodiment, pulse shaper 100 comprises a Schmitt trigger having a differentiated output.

The output of pulse shaper 100 is coupled to the set input of a ramp flip-flop 101, the set output of which is represented by wave form C. Ramp flip-flop 101 is used to initiate the operation of a ramp generator 103 (FIG. 12) and a reset signal generator 104 (FIG. 13), and to condition an amplitude limiter circuit 106 (FIG. 12) and an arming flip-flop 107 (FIG. 12).

Ramp generator 103 produces an output pulse of the type illustrated in wave form F in response to the application of a DC level signal to the input thereof. In the preferred embodiment the ramp generator circuit shown in FIG. 12 was employed; other equivalent circuits will occur to those skilled in the art.

Reset signal generator 104, the preferred embodiment of which is shown in FIG. 13, provides a reset signal as exemplified by wave form E after a predetermined time period, which signal is applied to the reset input of ramp flip-flop 101. As can be seen by a comparison of wave forms E and F, generation of the reset signal by reset signal generator 104 causes ramp generator 103 to enter the second phase of operation during which the output signal produced thereby decays at a relatively rapid rate. The reset time interval may be varied by adjustment of variable resistance 180 (See FIG. 13).

The output of ramp generator 103 is coupled through an emitter follower amplifier 105 to the input of an amplitude limiter 106, the preferred embodiment of which is shown in FIG. 12. The function of amplitude limiter 106 is to limit the amplitude of the output signal from ramp generator 103 to a predetermined maximum and to quickly quench the trailing portion of this output signal when the film frame is very nearly in position. Amplitude limiting is provided by a zener diode 200 (see FIG. 12). Quenching is accomplished by turning on a transistor 202 when arming flip-flop 107 is reset by a signal from photo cell 79 (indicating that the film frame is close to perfect registration as discussed more fully below), thereby providing a low impedance path from the input to ground potential. Transistor 204 provides a DC voltage level for the signal from ramp generator 103 when normally conducting. However, during the charging portion of the signal from ramp generator 103, transistor 204 is turned off by the condition signal from the reset output of ramp flip-flop 101. The output signal from amplitude limiter 106 is exemplified by wave form G.

The output of amplitude limiter 106 is coupled through an emitter follower amplifier 108 to a summing junction 110, the output of which provides the input to a balance amplifier 112, shown in FIG. 14. The output of balance amplifier 112 drives a power amplifier 114, the output of which in turn drives servo motor 41.

The output of servo motor 41 is mechanically linked to a velocity tachometer 44. The output of velocity tachometer 44, exemplified by wave form L, is coupled to summing junction 110. Power amplifier 114, servo motor 41 and velocity tachometer 44 are all well-known in the art. Accordingly, their details need not be further described.

The output of edge photo cell 78 is coupled via a regulated emitter follower amplifier 120, shown in FIG. 12, to a gate 124 also shown in FIG. 12. Gate 124 prevents variations in the amplitude of the output signal from amplifier 120 from affecting the voltage at summing junction 110 until the film frame is in near perfect registration. This is achieved by disabling gate 124 with the set output signal from arming flip-flop 107 (amplified by emitter follower amplifier 126), it being remembered that arming flip-flop 105 is set by ramp flip-flop 101 at the beginning of a cycle.

Gate 124 functions in the following manner. When arming flip-flop 107 is set by ramp flip-flop 101 the set output thereof is amplified by amplifier 126 and applied to junction 208 (FIG. 12). Zener diode 210 maintains junction 208 at the zener voltage until this signal is removed. After arming flip-flop 107 is reset by an output pulse from arming photo cell 79, junction 208 drops below the zener voltage. Thereafter, the relatively small amplitude variations from regulated amplifier 120 are transmitted by gate 124 to summing junction 110.

In operation, with synchronizing disc 50 rotating, an output pulse from photo cell 97 (wave form A) is shaped by pulse shaper 100 (wave form B) and applied to the set input of ramp flip-flop 101. Ramp flip-flop 101 is set thereby, and the set output thereof (wave form C) is amplified by amplifier 102 and applied to the input of ramp generator 103 and reset signal generator 104. The set output of ramp flip-flop 101 also sets arming flip-flop 107 (wave form J) to disable gate 124, thereby blocking the amplified output signal from edge photo cell 78. The reset output of ramp flip-flop 101 conditions amplitude limiter 106. The reset output of arming flip-flop 105 amplified by amplifier 128 suppresses the quenching action of amplitude limiter 106.

When the amplified output signal from ramp flip-flop 101 is applied to the input of ramp generator 103, the output thereof begins to rise at a controlled rate (wave form F). This rise continues until the output of reset signal generator 104 (wave form E) resets RAMP FLIP-FLOP 101 after a predetermined time interval (determined by the charging rate of the R-C network of reset signal generator 104 — see wave form D). Thereafter, the output of RAMP GENERATOR 103 falls at the relatively more rapid rate illustrated in wave form F.

During the above portion of the cycle, amplitude limiter 106 limits the output of ramp generator 103 to a maximum amplitude. The output of amplitude limiter 106 is amplified by amplifier 108 and applied to summing junction 110, along with the output of velocity tachometer 44 (initially null) and gate 124 (initially blocked). Servo motor 41 begins to rotate, pulling down film 10 and rotating position disc 42.

As servo motor 41 accelerates to a maximum speed, the trailing edge of the light blocking vane 91 clears light source 75, thereby illuminating edge photo cell 78 and causing an output signal to be applied therefrom through amplifier 120 to the input of gate 124 (wave form K). Since gate 124 is blocked at this time, however, this output signal does not function as a control signal during this portion of the cycle.

When reset signal generator 104 times out and resets ramp flip-flop 101, the amplitude limited output of ramp generator 103 begins to fall and servo motor 41 decelerates. Due to the relatively low impedance presented by amplifier 108, as compared to the velocity tachometer 44 output, the ramp signal generator 103 provides the principal driving signal for servo motor 41 through balance amplifier 112 and power amplifier 114 during this portion of the cycle.

As position disc 42 continues to rotate, the approaching hole 92 begins to unblock the light path between source 77 and arming photo cell 79. The output from photo cell 79 rises (wave form H), is amplified by emitter follower amplifier 135, and resets arming flip-flop 105 (wave form J). Reset of arming flip-flop 107 removes the DISABLE signal to gate 124, and enables amplitude limiter 106 to quench the remaining portion of the signal from ramp generator 103 (wave form G). Immediately thereafter, the output signal from velocity tachometer 44 predominates to decelerate servo motor 41, in cooperation with the signal from edge photo cell 78.

As position disc 42 continues to rotate, the leading edge of approaching vane 91 blocks increasing portions of the light from source 75 to edge photo cell 78, and the output signal from edge photo cell 78 falls. When this output signal has fallen to a predetermined threshold, a balanced null condition is obtained and servo motor 41 stops.

Upon receipt of subsequent pulses from synchronizing photo cell 97, the cycle repeats in the manner described above.

As will now be evident, the combination of arming photo cell 79 and edge photo cell 78 and the circuitry associated thereto provides a precise positioning system for film sprocket 35 via the servo loop comprising balance amplifier 112, power amplifier 114, servo motor 41, velocity tachometer 44, positioning disc 42, photo cells 78, 79 and their associated circuitry, and summing junction 110. During each pull down interval, initiated by a synchronizing pulse from photo cell 97, positioning disc 42 insures that film sprocket 35 will be rotated through a precise angular distance just sufficient to advance film 10 through film gate 33 by one frame 14 (i.e. four sprocket holes 12). This angular distance is defined by the angle subtended by the leading edges of successive vanes 91 of positioning disc 42, which comes to rest after each cycle at a null position at which a leading edge blocks a predetermined portion of the light from source 75 to edge photo cell 78. For a given installation this null position may be established empirically by adjusting gain control 240, magnitude control 242 (both FIG. 12) and balance control 244 (FIG. 14).

As will be evident to those skilled in the art, the system may be designed to operate with films having other sprocket hole-frame ratios than that employed in the preferred embodiment by modifying the number and placement of the synchronizing disc holes 98, and the vanes 91 and positioning disc holes 92. For example, to provide single frame advance of film having six sprocket holes per frame with a sprocket wheel 35 having twenty four teeth, a synchronizing disc 50 having four equispaced holes 98 may be installed along with a positioning disc 42 having four vanes 91 and four equispaced holes 92.

In the preferred embodiment the parameters of control circuit 76 are chosen to provide a pull down interval of ten milliseconds. Since the frame rate of twenty-four frames per second is equivalent to approximately 41 milliseconds, this rapid pull down interval allows approximately 31 milliseconds for film frame exposure or projection. This rather large exposure/projection time insures excellent image brightness and quality.

A further advantage afforded by the present invention results in the elimination of extremely abrupt initial acceleration and final deceleration of sprocket wheel 35 as found in known film framing and transport systems. With reference to wave form M of FIG. 11, it is seen that the control signal to servo motor 41 from power amplifier 114 has a leading edge which rises rapidly, but not instantaneously, to a maximum value. This insures that sprocket wheel 35 is initially accelerated from rest to a maximum velocity in a short time relative to the total "on" of servo motor 41 but without subjecting sprocket wheel 35 to a sudden extremely high initial rate of acceleration as is common in prior art systems. By thus reducing the initial rate of acceleration of sprocket wheel 35, the maximum initial force applied by sprocket teeth to the forward film edge bordering sprocket holes 12 is correspondingly reduced, thereby prolonging film life. In a similar manner, the control signal from power amplifier 114 has a trailing edge which rises rapidly, but not instantaneously, from a negative valve to a null value. This insures that sprocket wheel 35 is finally decelerated to zero velocity in a short time relative to the total "on" time of servo motor 41, without subjecting sprocket wheel 35 to a sudden extremely high final rate of deceleration as is common in prior art systems. By thus reducing the final rate of deceleration of sprocket wheel 35, the maximum braking force applied by the sprocket teeth to the rear film edge bordering sprocket holes 12 is correspondingly reduced.

As will now be evident, the film framing and transport system disclosed above provides a powerful and effective system for precisely positioning succeeding frames of film to be exposed or projected in a film gate. Further, it has been found that films repeatedly transported by film framing and transport systems constructed according to the invention exhibit little sprocket hole wear, thereby prolonging their life.

While the foregoing provides a full disclosure of the preferred embodiment of the invention, it is understood that various modifications, alternate constructions, and equivalents may be employed without departing from the true spirit and scope of the invention. For example, other equivalent logic circuits may be employed which provide the various control signals disclosed above. Moreover, film framing and transport systems constructed according to the invention may be employed for the purpose of transporting other films than motion picture films. Therefore, the above description and illustrations should not be construed as limiting the scope of the invention, which is solely defined by the appended claims.

What is claimed is:

1. In a film transport system for advancing successive frames of film through a film gate including a motor, film advance means driven by said motor for pulling said film frame by frame through said film gate, means for generating a train of motor drive signals, means for applying said motor drive signals to said motor for rotating said motor responsive to each of said signals through an angle required to cause said film advance means to move said film through said film gate the distance between frames; and positioning means for generating correction signals whenever said film advance means positions one of said film frames improperly in said film gate;

the improvement wherein said positioning means comprises suppress means coupled to said means for generating a train of motor drive signals for terminating said motor drive signals when said motor has been rotated through a predetermined angle less than said required angle; and correction means coupled to said motor for generating a positioning signal for rotating said motor through the remaining angular distance required to precisely position said frame in said film gate.

2. The apparatus of claim 1 wherein said suppress means comprises means for generating a suppress signal when said motor has been rotated through said predetermined angle and means for applying said suppress signal to said motor drive signal generating means.

3. The apparatus of claim 2 wherein said suppress signal generating means comprises a radiation source; a radiation dectector for generating an output signal when radiation is incident thereto from said source; means for transmitting radiation from said source to said detector when said motor has been rotated through said predetermined angle; and bistable means responsive to said output signal for producing said suppress signal.

4. The apparatus of claim 2 wherein said motor drive signal generating means includes means for preventing the generation of said suppress signal during the initial portion of at least one of said motor drive signals.

5. The apparatus of claim 1 wherein said correction means comprises a gate coupled to said suppress means and enabled thereby, means connecting the output of said gate to said motor, said positioning generating means includes means for generating a positioning signal as a function of the angular position of said motor, and means for applying said positioning signal to said gate to be applied thereby to said motor when said gate is enabled.

6. The apparatus of claim 5 wherein said positioning signal generating means comprises a radiation source, a synchronizing disc coupled to said motor for rotation therewith, said disc having a plurality of peripheral vanes each having a leading edge and a plurality of holes each associated to a different leading edge, an edge detector for generating an edge position signal as a function of the position of a leading edge relative to the radiation path between said source and said edge detector, means for coupling said edge position signal to said gate, an arming detector for generating an arming signal as a function of the proximity of said associated hole to the radiation path between said source and said arming detector, and means for coupling said arming signal to said suppress means.

7. the apparatus of claim 6 wherein said radiation source is positioned adjacent a first side of said synchronizing disc and said detectors are positioned on the opposite side thereof.

8. An apparatus for positioning frames of film in precise registration within a film gate comprising film advance means responsive to film advance signals to bring a frame of said film into said film gate, means for generating a first film advance signal for controlling said film advance means to move said frame only a portion of the distance into said film gate, film positioning means responsive to said frame reaching a predetermined position in said film gate for generating a second film advance signal for controlling said film advance means to move said frame the remainder of said distance into precise registration within said film gate, and means for applying said second film advance signal to said film advance means in place of said first film advance signal when said film has reached said predetermined position.

9. The apparatus of claim 8 wherein said film positioning means comprises a radiation source, a first radiation detector positioned adjacent said source for generating a second film advance signal in response to the reception thereby of radiation from said source, a rotatable positioning disc operatively coupled to said film advance means for rotation thereby and having at least one vane for modulating the amount of radiation received by said first detector, said vane being provided with an edge portion for establishing a frame registration reference position at which said second film advance signal generated by said first detector is terminated terminating further advance of said film.

10. The apparatus of claim 9 wherein said source and said first detector are positioned on opposite sides of said positioning disc.

11. The apparatus of claim 9 wherein said radiation source comprises a source of light energy and said first detector comprises a photocell.

12. An apparatus as recited in claim 8 wherein said means for terminating said first film advance signal when said frame reaches said predetermined position in said film gate, comprises a radiation source, a second radiation detector positioned adjacent said radiation source for generating an output signal in response to reception thereby of radiation from said source, a rotatable positioning disc operatively coupled to said film advancing means for rotation thereby and having at least one aperture therein for modulating the amount of radiation received by said second detector, means coupled to said second detector for generating a terminating signal and a gating signal in response to the generation of an output signal of a predetermined magnitude by said detector, means for terminating said first film advance signal responsive to said terminating signal, and means for applying said second film advance signal to said film advance means in response to said gating signal.

13. The apparatus of claim 12 wherein said radiation source and said second detector are positioned on opposite sides of said positioning disc.

14. The apparatus of claim 13 wherein said radiation source comprises a source of light energy and said second detector comprises a photocell.

15. A film framing and transport system for positioning frames of film having sprocket perforations in precise registration in a film gate comprising means for advancing said film toward said film gate in a series of film advance cycles;

means for generating a film advance signal for controlling said film advancing means during a portion of each said film advance cycle, said film advance signal generating means including means for providing each said film advance signal with an initial portion having a rapid rise relative to the length of each said film advance cycle but sufficiently gradual to prevent tearing of said sprocket perforations during acceleration of said film, and film positioning means responsive to the position of said film for generating a film position signal replacing said film advance signal for controlling said film advancing means to terminate advance of said film when a frame is in precise registration in said film gate, said film positioning means including means for shaping the terminating portion of said registration signal in a manner to avoid tearing of the film sprocket holes upon the termination of film motion.

16. The apparatus of claim 15 wherein said film positioning means further includes means for generating a steering signal for terminating the influence of said film advance signal on said film advancing means and for enabling said film position signal to control said film advancing means during the terminal position of a film advance cycle.

17. The apparatus of claim 16 wherein said film advance signal generating means includes a ramp generator for generating a ramp signal having a gradually increasing initial portion and a less gradual decreasing final portion an amplitude limiter for limiting said ramp signal to a maximum amplitude, and a quenching circuit for quickly dissipating the trailing portion of said ramp signal; and said signal steering means includes means for generating a signal for enabling said quenching circuit.

18. The apparatus of claim 16 further including a radiation source, a rotatable disc operatively associated with said film advancing means for rotation thereby, and wherein said film position signal generating means comprises a first radiation detector positioned adjacent said source for generating an output signal in response to the reception thereby of radiation from said source, and at least one vane carried by said disc for modulating the amount of radiation received by said first detector, said vane being provided with an edge portion for establishing a frame registration reference position at which said first detector generates an output signal of sufficient magnitude to terminate advance of said film.

19. The apparatus of claim 18 wherein said signal steering means comprises a second radiation detector positioned adjacent said radiation source for generating an output signal in response to the reception thereby of radiation from said source, at least one aperture in said disc for modulating the amount of radiation received by said second detector, means for gating said film positioning signals to said film advancing means, and means coupled to said second detector for generating signals for enabling said quenching circuit and said gating means during the terminal portion of a film advance cycle.

20. The apparatus of claim 19 wherein said first and second detectors are positioned on one side of said disc and said source is positioned on the opposite side of said disc.

21. The apparatus of claim 20 wherein said radiation source comprises a source of light energy and said first and second detectors each comprise a photocell.

22. An apparatus as recited in claim 21 wherein said film positioning means further includes means for terminating said first film advance signals when said frame reaches said predetermined position in said film gate.

* * * * *